United States Patent
Nabata et al.

(10) Patent No.: US 9,191,749 B2
(45) Date of Patent: Nov. 17, 2015

(54) ELECTRONIC DEVICE THAT VIBRATES AN ELEMENT FOR SOUND TRANSMISSION

(71) Applicant: KYOCERA CORPORATION, Kyoto-shi Kyoto (JP)

(72) Inventors: Toshihisa Nabata, Sagamihara (JP); Satoshi Mizuta, Sagamihara (JP); Tomoaki Miyano, Kameyama (JP); Kiyokazu Sato, Yokohama (JP); Akio Kihara, Kawasaki (JP); Shun Kazama, Yokohama (JP); Yasuhiro Katayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/002,675

(22) PCT Filed: Apr. 12, 2013

(86) PCT No.: PCT/JP2013/002530
§ 371 (c)(1),
(2) Date: Aug. 30, 2013

(87) PCT Pub. No.: WO2013/153828
PCT Pub. Date: Oct. 17, 2013

(65) Prior Publication Data
US 2014/0355777 A1 Dec. 4, 2014

(30) Foreign Application Priority Data
Apr. 12, 2012 (JP) ................. 2012-091125

(51) Int. Cl.
*H04R 17/00* (2006.01)
*H04M 1/03* (2006.01)
(Continued)

(52) U.S. Cl.
CPC .............. *H04R 17/005* (2013.01); *H04M 1/03* (2013.01); *H04R 1/00* (2013.01); *H04R 3/002* (2013.01); *H04R 3/04* (2013.01); *H04R 7/045* (2013.01); *H04R 17/00* (2013.01); *H04R 2499/11* (2013.01)

(58) Field of Classification Search
CPC .... H04R 17/00; H04R 2499/11; H04R 7/045; H04R 2499/15; H04R 2440/05; H04R 2460/13; H04R 1/025; H04M 1/0266; H04M 1/03
USPC ......... 381/306, 151, 152, 333, 334, 164, 190, 381/191; 379/93.19, 101.01, 433.01, 379/433.02, 433.04, 433.07; 455/566, 455/575.1
See application file for complete search history.

(56) References Cited

U.S. PATENT DOCUMENTS 3,728,741 A  4/1973  Lepor
6,259,188 B1  7/2001  Woodard et al.
(Continued)

FOREIGN PATENT DOCUMENTS

EP  1542064 A1  6/2005
EP  2793483 A1  10/2014
(Continued)

OTHER PUBLICATIONS

Japanese Office Action; JP2012-148798; Jul. 31, 2012.
(Continued)

*Primary Examiner* — Vivian Chin
*Assistant Examiner* — Jason R Kurr
(74) *Attorney, Agent, or Firm* — Studebaker & Brackett PC (57) ABSTRACT

Provided is an electronic device that is capable of reducing sound leakage from a vibration plate vibrated by a piezoelectric element. An electronic device 1 of the present invention includes: a piezoelectric element 30; and a vibration plate 10 configured to be vibrated by the piezoelectric element 30. Vibration sound is transmitted by the vibration plate vibrating a part of a human body. The piezoelectric element 30 is vibrated using a processed sound signal in which at least a part of frequency components of a sound reproduction signal that are higher than a predetermined threshold value is cut or attenuated.

12 Claims, 9 Drawing Sheets

(51) Int. Cl.
*H04R 1/00* (2006.01)
*H04R 3/00* (2006.01)
*H04R 3/04* (2006.01)
*H04R 7/04* (2006.01)

(56) References Cited

U.S. PATENT DOCUMENTS

| | | | |
|---|---|---|---|
| 6,427,017 B1* | 7/2002 | Toki | 381/190 |
| 7,050,600 B2* | 5/2006 | Saiki et al. | 381/388 |
| 7,174,025 B2* | 2/2007 | Azima et al. | 381/152 |
| 7,421,088 B2 | 9/2008 | Cranfill et al. | |
| 7,512,425 B2* | 3/2009 | Fukuda | 455/575.1 |
| 7,657,042 B2* | 2/2010 | Miyata | 381/152 |
| 8,199,959 B2* | 6/2012 | Miyata | 381/388 |
| 8,200,289 B2* | 6/2012 | Joo et al. | 455/566 |
| 8,279,623 B2 | 10/2012 | Idzik et al. | |
| 8,848,967 B2* | 9/2014 | Joo | 381/388 |
| 2001/0026625 A1 | 10/2001 | Azima et al. | |
| 2002/0065113 A1* | 5/2002 | Mori | 455/567 |
| 2002/0067841 A1 | 6/2002 | Bank et al. | |
| 2002/0076061 A1 | 6/2002 | Ashtiani et al. | |
| 2004/0109571 A1 | 6/2004 | Yoshimine | |
| 2005/0002537 A1 | 1/2005 | Azima et al. | |
| 2005/0057527 A1 | 3/2005 | Takenaka et al. | |
| 2005/0129267 A1 | 6/2005 | Azima et al. | |
| 2005/0169112 A1 | 8/2005 | Shimizu | |
| 2006/0093165 A1 | 5/2006 | Kamimura et al. | |
| 2006/0140424 A1 | 6/2006 | Kobayashi | |
| 2006/0227981 A1 | 10/2006 | Miyata | |
| 2006/0286998 A1 | 12/2006 | Fukuda | |
| 2007/0057909 A1 | 3/2007 | Schobben et al. | |
| 2007/0097073 A1 | 5/2007 | Takashima et al. | |
| 2008/0268921 A1 | 10/2008 | Taniguchi et al. | |
| 2009/0103767 A1 | 4/2009 | Kuroda et al. | |
| 2009/0147969 A1 | 6/2009 | Kinouchi et al. | |
| 2009/0290746 A1 | 11/2009 | Miyata | |
| 2009/0296976 A1 | 12/2009 | Tsai et al. | |
| 2010/0225600 A1 | 9/2010 | Dai et al. | |
| 2010/0278362 A1 | 11/2010 | Kim | |
| 2011/0234459 A1 | 9/2011 | Yabe | |
| 2012/0063074 A1 | 3/2012 | Matsuda et al. | |
| 2013/0051585 A1* | 2/2013 | Karkkainen et al. | 381/151 |
| 2013/0308798 A1 | 11/2013 | Lee | |
| 2014/0342783 A1 | 11/2014 | Suzuki et al. | |
| 2015/0023531 A1 | 1/2015 | Horii et al. | |

FOREIGN PATENT DOCUMENTS

| | | |
|---|---|---|
| JP | S62-86799 U | 6/1987 |
| JP | H07-296786 A | 11/1995 |
| JP | H08-223675 A | 8/1996 |
| JP | H09-247795 A | 9/1997 |
| JP | H11-25940 A | 1/1999 |
| JP | 2001-007546 A | 1/2001 |
| JP | 2002-027065 A | 1/2002 |
| JP | 2002-185593 A | 6/2002 |
| JP | 2002-219413 A | 8/2002 |
| JP | 2002-232542 A | 8/2002 |
| JP | 2002-305569 A | 10/2002 |
| JP | 2004-187031 A | 7/2004 |
| JP | 2005-214793 A | 8/2005 |
| JP | 2005-236352 A | 9/2005 |
| JP | 2005-284054 A | 10/2005 |
| JP | 2005-348193 A | 12/2005 |
| JP | 2007-502594 A | 2/2007 |
| JP | 2007-082009 A | 3/2007 |
| JP | 2007-180827 A | 7/2007 |
| JP | 2007-189578 A | 7/2007 |
| JP | 2008-017398 A | 1/2008 |
| JP | 2008-270879 A | 11/2008 |
| JP | 2009-118396 A | 5/2009 |
| JP | 2011-091719 A | 5/2011 |
| JP | 2013-110535 A | 6/2013 |
| JP | 5255142 B1 | 8/2013 |
| JP | 2013-207795 A | 10/2013 |
| JP | 2013-207796 A | 10/2013 |
| JP | 2013-223238 A | 10/2013 |
| JP | 2013-232874 A | 11/2013 |
| JP | 2013-255212 A | 12/2013 |
| KR | 10-1068254 B1 | 9/2011 |
| WO | 2004/023199 A1 | 3/2004 |
| WO | 2004/051967 A1 | 6/2004 |
| WO | 2006/059679 A1 | 6/2006 |
| WO | 2006/114985 A1 | 11/2006 |
| WO | 2012/025783 A1 | 3/2012 |

OTHER PUBLICATIONS

Japanese Office Action; JP2012-148798; Jan. 8, 2013.
Japanese Office Action; JP2012-148798; Apr. 23, 2013.
An Office Action issued by the Japanese Patent Office on Aug. 28, 2012, which corresponds to Japanese Patent Application No. 2012-148834 and is related to U.S. Appl. No. 14/002,357 and U.S. Appl. No. 14/002,675.
An Office Action issued by the Japanese Patent Office on Feb. 5, 2013, which corresponds to Japanese Patent Application No. 2012-148834 and is related to U.S. Appl. No. 14/002,357 and U.S. Appl. No. 14/002,675.
An Office Action issued by the Japanese Patent Office on Apr. 23, 2013, which corresponds to Japanese Patent Application No. 2012-148834 and is related to U.S. Appl. No. 14/002,357 and U.S. Appl. No. 14/002,675.
An Office Action issued by the Japanese Patent Office on Aug. 26, 2014, which corresponds to Japanese Patent Application No. 2014-016081 and is related to U.S. Appl. No. 14/002,357 and U.S. Appl. No. 14/002,675.
An Office Action issued by the Japanese Patent Office on Aug. 26, 2014, which corresponds to Japanese Patent Application No. 2014-016048 and is related to U.S. Appl. No. 14/002,668 and U.S. Appl. No. 14/002,675.
An Office Action issued by the Japanese Patent Office on Jul. 31, 2012, which corresponds to Japanese Patent Application No. 2012-148844 and is related to U.S. Appl. No. 14/002,668 and U.S. Appl. No. 14/002,675.
An Office Action issued by the Japanese Patent Office on Jan. 8, 2013, which corresponds to Japanese Patent Application No. 2012-148844 and is related to U.S. Appl. No. 14/002,668 and U.S. Appl. No. 14/002,675.
An Office Action issued by the Japanese Patent Office on Jul. 31, 2012, which corresponds to Japanese Patent Application No. 2012-148773 and is related to U.S. Appl. No. 14/002,699 and U.S. Appl. No. 14/002,675.
An Office Action issued by the Japanese Patent Office on Jan. 8, 2013, which corresponds to Japanese Patent Application No. 2012-148773 and is related to U.S. Appl. No. 14/002,699 and U.S. Appl. No. 14/002,675.
An Office Action issued by the Japanese Patent Office on Jul. 31, 2012, which corresponds to Japanese Patent Application No. 2012-148809 and is related to U.S. Appl. No. 14/002,698 and U.S. Appl. No. 14/002,675.
An Office Action issued by the Japanese Patent Office on Jan. 8, 2013, which corresponds to Japanese Patent Application No. 2012-148809 and is related to U.S. Appl. No. 14/002,698 and U.S. Appl. No. 14/002,675.
International Search Report; PCT/JP2013/002789; issued on Jun. 11, 2013, which corresponds to U.S. Appl. No. 14/002,357 and U.S. Appl. No. 14/002,675.
International Search Report; PCT/JP2013/002088; issued on May 14, 2013, which corresponds to U.S. Appl. No. 14/002,668 and U.S. Appl. No. 14/002,675.
International Search Report; PCT/JP2013/002874; issued on Jun. 11, 2013, which corresponds to U.S. Appl. No. 14/002,699 and U.S. Appl. No. 14/002,675.
International Search Report; PCT/JP2013/002138; issued on May 14, 2013, which corresponds to U.S. Appl. No. 14/002,698 and U.S. Appl. No. 14/002,675.

(56) References Cited

OTHER PUBLICATIONS

The extended European search report issued by the European Patent Office on Jun. 11, 2013, which corresponds to European Patent Application No. 13163442.0 and is related to U.S. Appl. No. 13/862,333 and U.S. Appl. No. 14/002,675.

An Office Action; "Notice of Reasons for Rejection," issued by the Japanese Patent Office on Dec. 2, 2014, which corresponds to Japanese Patent Application No. 2014-016082 and is related to U.S. Appl. No. 14/002,675; with English language concise explanation.

An Office Action; "Notice of Reasons for Rejection," issued by the Japanese Patent Office on Dec. 2, 2014, which corresponds to Japanese Patent Application No. 2014-016046 and is related to U.S. Appl. No. 14/002,698 and U.S. Appl. No. 14/002,675; with English language concise explanation.

International Search Report; PCT/2013/002530; May 14, 2013.

An Office Action; "Notice of Reasons for Rejection," issued by the Japanese Patent Office on Mar. 17, 2015, which corresponds to Japanese Patent Application No. 2014-016048 and is related to U.S. Appl. No. 14/002,668 and U.S. Appl. No. 14/002,675; with English language concise explanation.

An Office Action; "Notice of Reasons for Rejection," issued by the Japanese Patent Office on Mar. 24, 2015, which corresponds to Japanese Patent Application No. 2012-091021 and is related to U.S. Appl. No. 13/862,333 and U.S. Appl. No. 14/002,675; with English language concise explanation.

An Office Action; "Notice of Reasons for Rejection," issued by the Japanese Patent Office on Feb. 10, 2015, which corresponds to Japanese Patent Application No. 2012-089203 and is related to U.S. Appl. No. 13/860,150 and U.S. Appl. No. 14/002,675; with English language concise explanation.

The extended European search report issued by the European Patent Office on Aug. 5, 2015, which corresponds to European Patent Application No. 13780570.1-1910 and is related to U.S. Appl. Nos. 14/002,699 and 14/002,675.

The extended European search report issued by the European Patent Office on Jul. 30, 2015, which corresponds to European Patent Application No. 13767862.9-1972 and is related to U.S. Appl. Nos. 14/807,865 and 14/002,675.

\* cited by examiner

ELECTRONIC DEVICE THAT VIBRATES AN ELEMENT FOR SOUND TRANSMISSION

CROSS-REFERENCE TO RELATED APPLICATION

This application claims priority to and the benefit of Japanese Patent Application No. 2012-091125 filed on Apr. 12, 2012, the entire contents of which are incorporated herein by reference.

FIELD

The present invention relates to an electronic device that vibrates a panel by applying a predetermined electric signal (i.e. a sound reproduction signal) to a piezoelectric element and that transfers the vibration of the panel to a human body to thereby transmit air conduction sound and human body vibration sound to a user.

BACKGROUND

Patent Literature 1 listed below describes an electronic device such as a mobile phone that transmits air conduction sound and bone conduction sound to a user. Patent Literature 1 also describes that the air conduction sound is sound perceived by an auditory nerve of a user as a result of an eardrum being vibrated by an air vibration that is created by a vibration of an object and that travels through an external auditory canal down to the eardrum. Furthermore, Patent Literature 1 describes that human body conduction sound is transmitted to the auditory nerve of the user through a part of a user's body (e.g. a cartilaginous portion of an external ear) that is in contact with the vibrating object.

According to Patent Literature 1, in the described mobile phone, a rectangular plate-shaped vibration body configured by piezoelectric bimorph and a flexible material is attached to an outer surface of a housing via an elastic member. Patent Literature 1 also describes that, upon application of a voltage to the piezoelectric bimorph of the vibration body, the piezoelectric material is expanded and contracted in a longitudinal direction, thereby causing the vibration body to undergo flexture vibration. As a result, when the user places the vibration body in contact with an auricle, air conduction sound and human body conduction sound are transmitted to the user.

CITATION LIST

Patent Literature 1: Japanese Patent Application Publication No. 2005-348193

SUMMARY

In the electronic device described in Patent Literature 1, there are no measures taken to prevent sound leakage from an outer surface of the housing that occurs when the housing of the phone is vibrated by the vibration body.

The present invention is to provide an electronic device that is capable of reducing sound leakage resulting from a vibration plate that is vibrated by the piezoelectric element.

One aspect of the present invention resides in an electronic device including: a piezoelectric element; and a vibration plate configured to be vibrated by the piezoelectric element, vibration sound being transmitted by the vibration plate vibrating a part of a human body, wherein the piezoelectric element is vibrated using a processed sound signal in which at least a part of frequency components of a sound reproduction signal that are higher than a predetermined threshold value is cut or attenuated.

An attenuation rate of the processed sound signal with respect to the sound reproduction signal may be increased gradually or stepwise at higher frequencies.

The cutting or the attenuation of the at least the part of the frequency components higher than the predetermined threshold value may be performed by a filter.

Another aspect of the present invention resides in an electronic device including: a piezoelectric element; and a vibration plate configured to be vibrated by the piezoelectric element, vibration sound being transmitted by the vibration plate vibrating a part of a human body, wherein a vibration of the piezoelectric element according to frequencies of a sound reproduction signal that are higher than a predetermined threshold value is reduced or restrained.

The vibration according to frequency components higher than the predetermined threshold value of the sound reproduction signal may be reduced gradually or stepwise at higher frequencies, compared with a case where the sound reproduction signal is used for the vibration.

The sound reproduction signal may include sound in frequencies of from 0.4 kHz to 3.4 kHz, and the predetermined threshold value may be set to be any one of the frequencies of from 0.4 kHz to 3.4 kHz.

Frequency components lower than or equal to the predetermined threshold value do not need to be cut or to be attenuated.

The vibration according to frequencies lower than or equal to the predetermined threshold value does not need to be reduced or to be restrained.

The vibration plate may be configured to generate the vibration sound and air-conduction sound.

According to the electronic device of the present invention, sound leakage from the vibration plate vibrated by the piezoelectric element is reduced.

BRIEF DESCRIPTION OF DRAWINGS

The present invention will be further described below with reference to the accompanying drawings, wherein.

DESCRIPTION OF EMBODIMENTS

Figure 1:
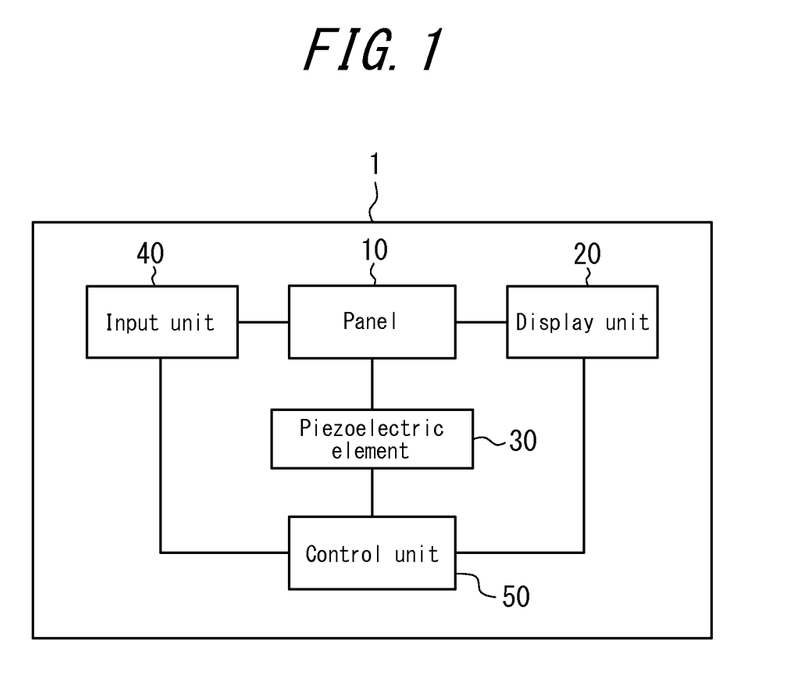
FIG. 1 is a function block diagram of an electronic device according to one embodiment of the present invention.

Embodiments of the present invention will be described with reference to the accompanying drawings. FIG. 1 is a function block diagram of an electronic device 1 according to one embodiment of the present invention. The electronic device 1, which is a mobile phone (smartphone), for example, includes a panel 10, a display unit 20, a piezoelectric element 30, an input unit 40, and a control unit 50.

The panel 10 may be a touch panel that is configured to detect a contact, a cover panel that protects the display unit 20, or the like. The panel 10 functions as a vibration plate that is vibrated by the piezoelectric element 30. The panel 10 may be made of glass or a synthetic resin such as acryl. The panel 10 preferably has a plate shape. The panel 10 may be a flat plate or a curved panel having a gradually inclined surface. When the panel 10 is the touch panel, the panel 10 detects a contact made by a finger of a user, a pen, a stylus pen, or the like. The touch panel may detect a contact using any type, such as the capacitive type, the resistive film type, a surface acoustic wave type (or an ultrasonic type), an infrared type, an electromagnetic induction type, a load detection type, and the like.

The display unit 20 is a display device such as a liquid crystal display, an organic EL display, and an inorganic EL display. The display unit 20 is disposed on a back surface of the panel 10. The display unit 20 may be disposed on the back surface of the panel 10 using a joining member (e.g. an adhesive agent). The display unit 20 may also be adhered to the panel 10 by the joining member (e.g. the adhesive agent). As another example, the display unit 20 may be disposed to be spaced apart from the panel 10 and supported by the housing of the electronic device 1.

The piezoelectric element 30 is an element that is configured to undergo expansion and contraction or bending (flexure) in accordance with an electromechanical coupling factor of a constituent material in response to an electric signal (voltage) applied thereto. As a material of the element, ceramic and crystal are used, for example. The piezoelectric element 30 may be a unimorph, a bimorph, or a laminated piezoelectric element. The laminated piezoelectric element includes a laminated unimorph element in which (e.g. 16 or 24 layers of) unimorph are laminated or a laminated bimorph element in which (e.g. 16 or 24 layers of) bimorph are laminated. The laminated piezoelectric element is configured by a laminated structure of a plurality of dielectric layers made of PZT (lead zirconate titanate) and electrode layers each disposed between adjacent ones of the dielectric layers, for example. Unimorph undergoes expansion and contraction in response to an electric signal (voltage) applied thereto, and bimorph undergoes bending in response to an electric signal (voltage) applied thereto.

The piezoelectric element 30 is disposed on the back surface of the panel 10 (i.e. a surface of an inner side of the electronic device 1). The piezoelectric element 30 is attached to the panel 10 by a joining member (e.g. a double-sided adhesive tape). The piezoelectric element 30 may be attached to the panel 10 via an intermediate member (e.g. a metal plate). The piezoelectric element 30 is at a predetermined distance from a surface of an inner side of a housing 60 in a state where the piezoelectric element 30 is disposed on the back surface of the panel 10. Preferably, the piezoelectric element 30 remains at a predetermined distance from the surface of the inner side of the housing 60 even in a state where the piezoelectric element 30 undergoes expansion and contraction or flexure. That is to say, the distance between the piezoelectric element 30 and the surface of the inner side of the housing 60 is preferably greater than a maximum amount of deformation of the piezoelectric element 30.

The input unit 40 is configured to receive an operation input from the user and is configured using an operation button (an operation key), for example. When the panel 10 is the touch panel, the panel 10 is also capable of receiving an operation input from the user by detecting a contact made by the user.

The control unit 50 is a processor configured to control the electronic device 1. The control unit 50 applies, to the piezoelectric element 30, a predetermined electric signal (voltage corresponding to a sound reproduction signal). The voltage that the control unit 50 applies to the piezoelectric element 30 may be ±15 V which is greater than ±5 V, that is, an application voltage of a so-called panel speaker for a purpose of sound conduction using not human body vibration sound but air conduction sound. With the above configuration, even when the user forcefully presses the panel 10 against a user's body with force greater than or equal to 3 N (e.g. force ranging from 5 N to 10 N), the vibration of the panel 10 occurs. As a result, human body vibration sound which is transmitted through a part of the user's body is generated. Note that an amount of the application voltage is appropriately adjustable according to how tightly the panel 10 is fixed to the housing or a support member or according to a capability of the piezoelectric element 30. When the control unit 50 applies an electric signal to the piezoelectric element 30, the piezoelectric element 30 undergoes expansion and contraction or flexure in a longitudinal direction. At this point, the panel 10 attached with the piezoelectric element 30 is deformed in conjunction with expansion and contraction or flexure of the piezoelectric element 30, thus resulting in the vibration of the panel 10. The panel 10 undergoes flexure in response to expansion and contraction or flexure of the piezoelectric element 30. The panel 10 is bent directly by the piezoelectric element 30. The state in which the "panel 10 is bent directly by the piezoelectric element" differs from a phenomenon in which the panel is deformed when a certain area of the panel is vibrated due to inertial force of a piezoelectric actuator including the piezoelectric element provided in a casing as adopted in an existing panel speaker. The state in which the "panel 10 is bent directly by the piezoelectric element" includes a state in which the panel is bent directly by expansion and contraction or bending (flexure) of the piezoelectric element via the joining member or via the joining member and a reinforcing member 80 which is later described. Thus, the panel 10 generates air-conduction sound, and the panel 10 also generates human body vibration sound that is transmitted through a part of the body when the user places the part of the body (e.g. the cartilaginous portion of the external ear) in contact with the panel 10. For example, the control unit 50 may apply an electric signal corresponding to a sound reproduction signal representing voice of a party on the phone or the like, so as to generate air-conduction sound and human body vibration sound that correspond to the sound reproduction signal. The sound reproduction signal may represent a phone melody, music including a tune, or the like. The sound reproduction signal according to the electric signal may be based on music data stored in an internal memory of the electronic device 1 or may be reproduced according to music data stored in an external server and the like via the network.

The vibration is caused in an area of the panel 10 where the piezoelectric element 30 is disposed and in areas of the panel 10 that are away from the disposed area. The panel 10 includes, in the areas vibrated, a plurality of portions that are configured to vibrate in a direction intersecting with a main surface of the panel 10, and in each of the plurality of portions, a value indicating an amplitude of the vibration transitions over time from plus to minus or vice versa. The panel 10 is vibrated such that areas with relatively large amplitude of vibration and areas with relatively small amplitude of vibration are seemingly distributed randomly or in a cyclic manner across the panel 10 at a certain moment. In other words, the vibration of a plurality of wavelengths is detected across all areas of the panel 10. In order to prevent the aforementioned vibration of the panel 10 from being attenuated even when the user forcefully presses the panel 10 against the user's body with force ranging from 5 N to 10 N, for example, the voltage that the control unit 50 applies to the piezoelectric element 30 may be ±15 V. The above configuration allows the user to listen to sound while placing the ear in contact with the areas of the panel 10 that are away from the disposed area.

Figure 2:
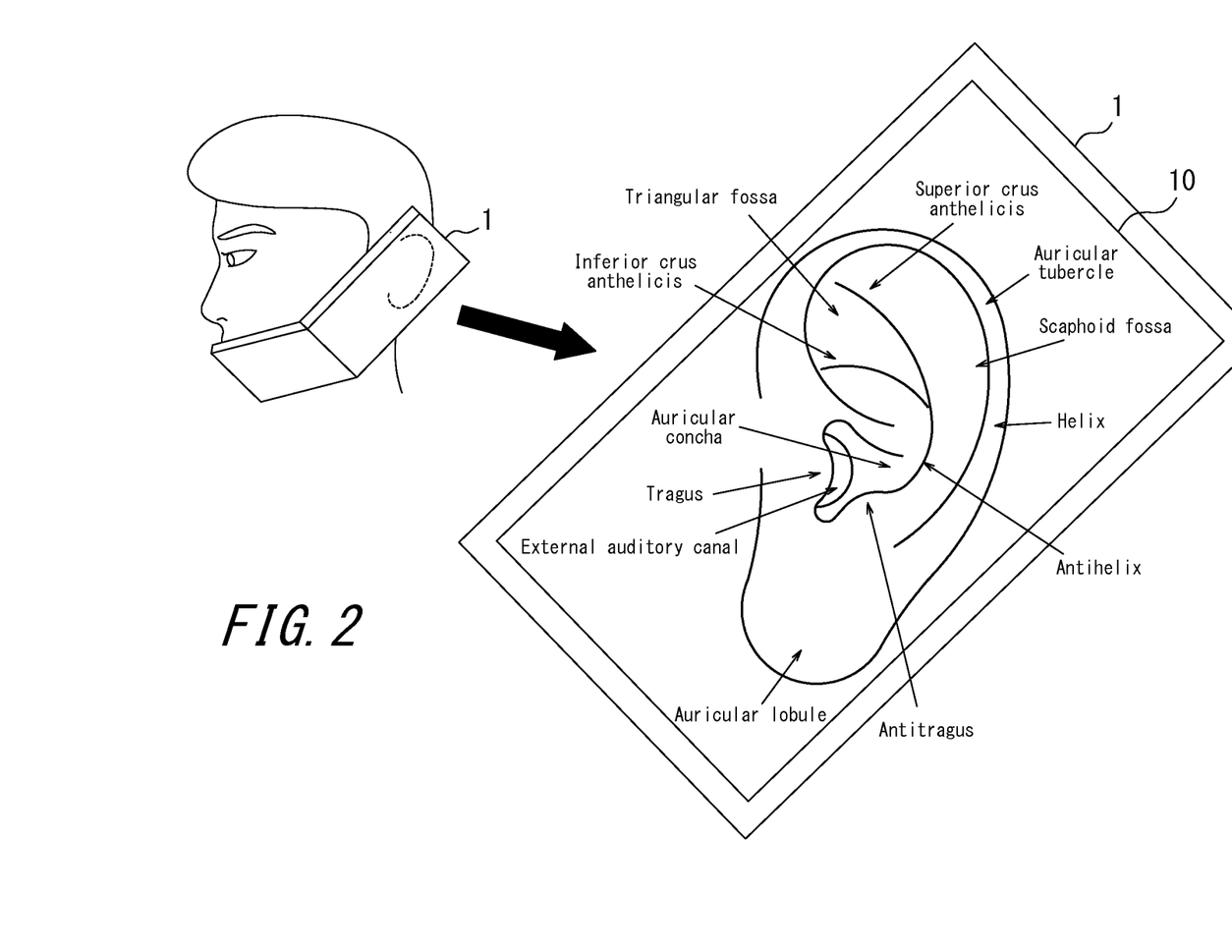
FIG. 2 illustrates a preferable shape of a panel.

It is to be noted that the panel 10 may be as large as the user's ear. As illustrated in FIG. 2, the panel 10 may also be larger than the user's ear. In this case, when the user listens to sound, the whole ear tends to be covered by the panel 10 of the electronic device 1. As a result, ambient sound (noise) is prevented from entering through an external auditory canal. It is suffice for the vibration to occur in an area of the panel 10 that is larger than an area having a length corresponding to a distance from an inferior crus of antihelix (i.e. an inferior crus anthelicis) to an antitragus and a width corresponding to a distance from a tragus to an antihelix. It is preferable for the vibration to occur in an area of the panel 10 that is larger than an area having a length corresponding to a distance from a portion of a helix that is near a superior crus of antihelix (i.e. a superior crus anthelicis) to an auricular lobule and a width corresponding to a distance from the tragus to a portion of the helix that is near the antihelix. The areas having the above lengths and widths may have a rectangular shape or an elliptical shape with as a major axis corresponding to the length and a minor axis corresponding to the width. Average ear size of the Japanese can be seen from the Japanese Body Dimension Database (1992-1994) or the like distributed by the Research Institute of Human Engineering for Quality Life (HQL). The panel 10 with a size greater than the average ear size of the Japanese would be generally capable of covering a whole ear of a foreigner as well.

The above electronic device 1 is capable of transmitting, to the user, air-conduction sound and human body vibration sound which is transmitted through a part of the user's body (e.g. the cartilaginous portion of the external ear). Accordingly, when the panel 10 outputs sound at substantially the same volume level as a dynamic receiver, less amount of sound propagates to an external environment of the electronic device 1 due to the vibration of air resulting from the vibration of the panel 10, compared to a case of the dynamic receiver. Accordingly, the electronic device 1 is well-suited for a situation where a recorded message is listened to on the train and the like, for example.

The electronic device 1 generates sound which is transmitted to an inner part of the human body by the vibration of the panel 10 generated by the piezoelectric element 30. The sound to be transmitted to an inner part of the human body passes through a soft tissue of the human body (e.g. the cartilage) to vibrate a middle ear or an inner ear. Furthermore, since the above electronic device 1 transmits human body vibration sound by the vibration of the panel 10, even when the user wears an earphone or a headphone, the user is able to listen to sound though the earphone or the headphone and a portion of the body by placing the electronic device 1 in contact with the earphone and the headphone.

The above electronic device 1 transmits sound to the user by the vibration of the panel 10. Accordingly, in a case where the electronic device 1 is not provided with an additional dynamic receiver, it is not necessary to provide the housing with an opening (i.e. a sound discharge opening) for sound transmission. As a result, the waterproof structure of the electronic device 1 is simplified. When the electronic device 1 is provided with a dynamic receiver, the sound discharge opening may be closed by a member that passes air through and blocks liquid. The member that passes air through and blocks liquid may be, for example, Gore-Tex™.

Figure 8:
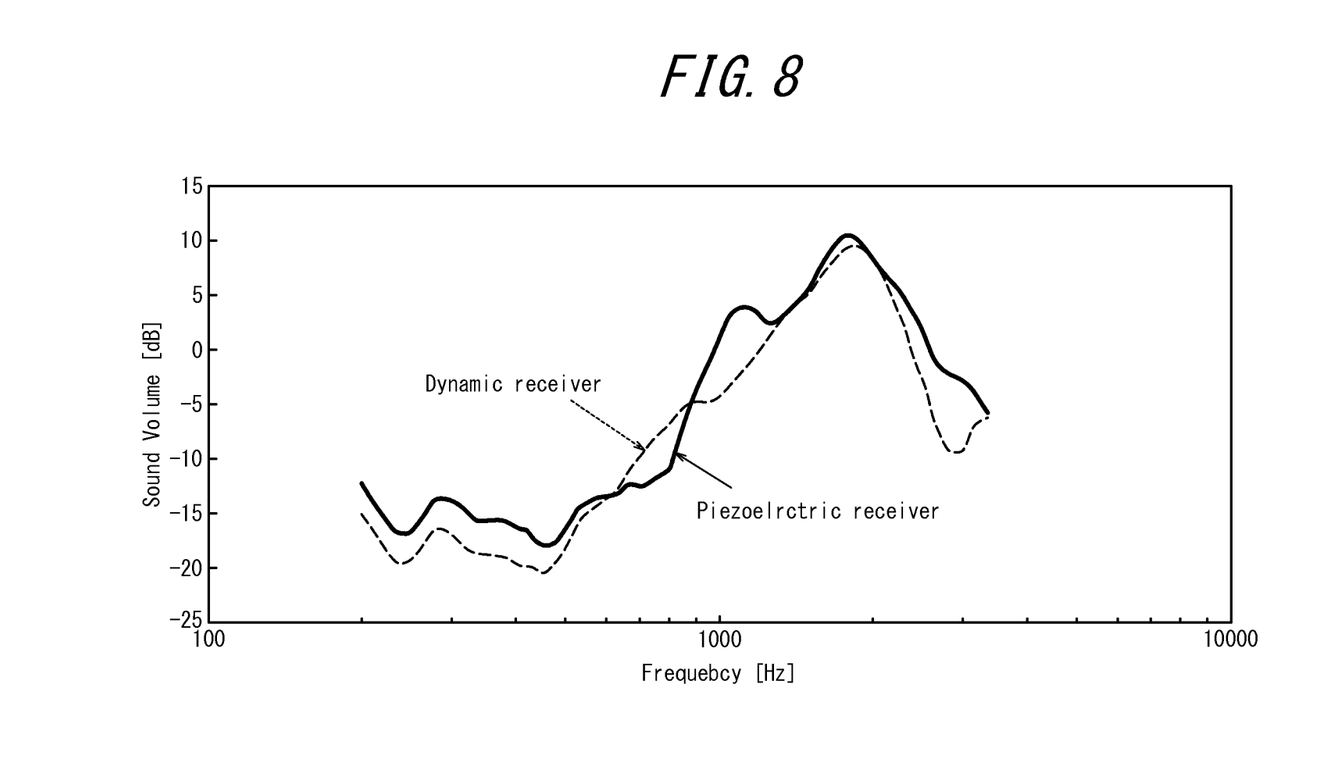
FIG. 8 illustrates one example of sound leakage characteristics of receivers.

In the electronic device 1, the control unit 50 is capable of vibrating the piezoelectric element using a processed sound signal in which at least a part of frequency components of a sound reproduction signal that are higher than a predetermined threshold value is cut or attenuated. That is to say, the electronic device 1 is capable of reducing or restraining the vibration of the piezoelectric element 30 according to frequencies of the sound reproduction signal that are higher than a predetermined threshold value. The reason is that the piezoelectric receiver, which vibrates the panel 10 by the piezoelectric element 30, produces a larger amount of sound leakage in high frequency components than a general dynamic receiver. FIG. 8 illustrates one example of sound leakage characteristics of the receivers. As illustrated, the piezoelectric receiver produces the larger amount of sound leakage than the dynamic receiver in the frequency components higher than or equal to 2 kHz. Accordingly, the control unit 50 is capable of vibrating the piezoelectric element 30 using the processed sound signal in which at least a part of the frequency components of the sound reproduction signal that are higher than 2 kHz, for example, is cut or attenuated. With the above configuration, in high frequencies where sound leakage is likely to occur, the amount of vibration of the piezoelectric element 30 is reduced, and sound leakage is restrained. Note that the sound leakage characteristic varies according to the structure of the electronic device 1, and needless to say, the predetermined threshold value is not limited to 2 kHz. For example, the sound reproduction signal pertaining to a voice call includes sound in frequencies of from 0.4 kHz to 3.4 kHz, and the predetermined threshold value may be set to be any one of the frequencies of from 0.4 kHz to 3.4 kHz. With the above setting, a preferable voice reception characteristic is obtained, and sound leakage is reduced.

The control unit 50 is also capable of generating the processed sound signal by increasing an attenuation rate with respect to the sound reproduction signal gradually or stepwise at higher frequencies. That is to say, in the electronic device 1, the vibration according to the frequency components of the sound reproduction signal that are higher than the predetermined threshold value is decreased gradually or stepwise at higher frequencies, compared with a case where the sound reproduction signal is used to for the vibration. With the above configuration, the amount of vibration of the piezoelectric element 30 is reduced for sound in the high frequencies where sound leakage is likely to occur.

The control unit 50 may be configured not to cut or attenuate frequency components that are lower than or equal to the predetermined threshold value. That is to say, the electronic device 1 does not have to reduce or restrain the vibration according to frequencies lower than or equal to the threshold value. With the above configuration, sound is reproduced as air-conduction sound and bone conduction sound, without reducing the amount of the vibration of the piezoelectric element 30 for the frequency components where sound leakage is less likely to occur.

Figure 9:
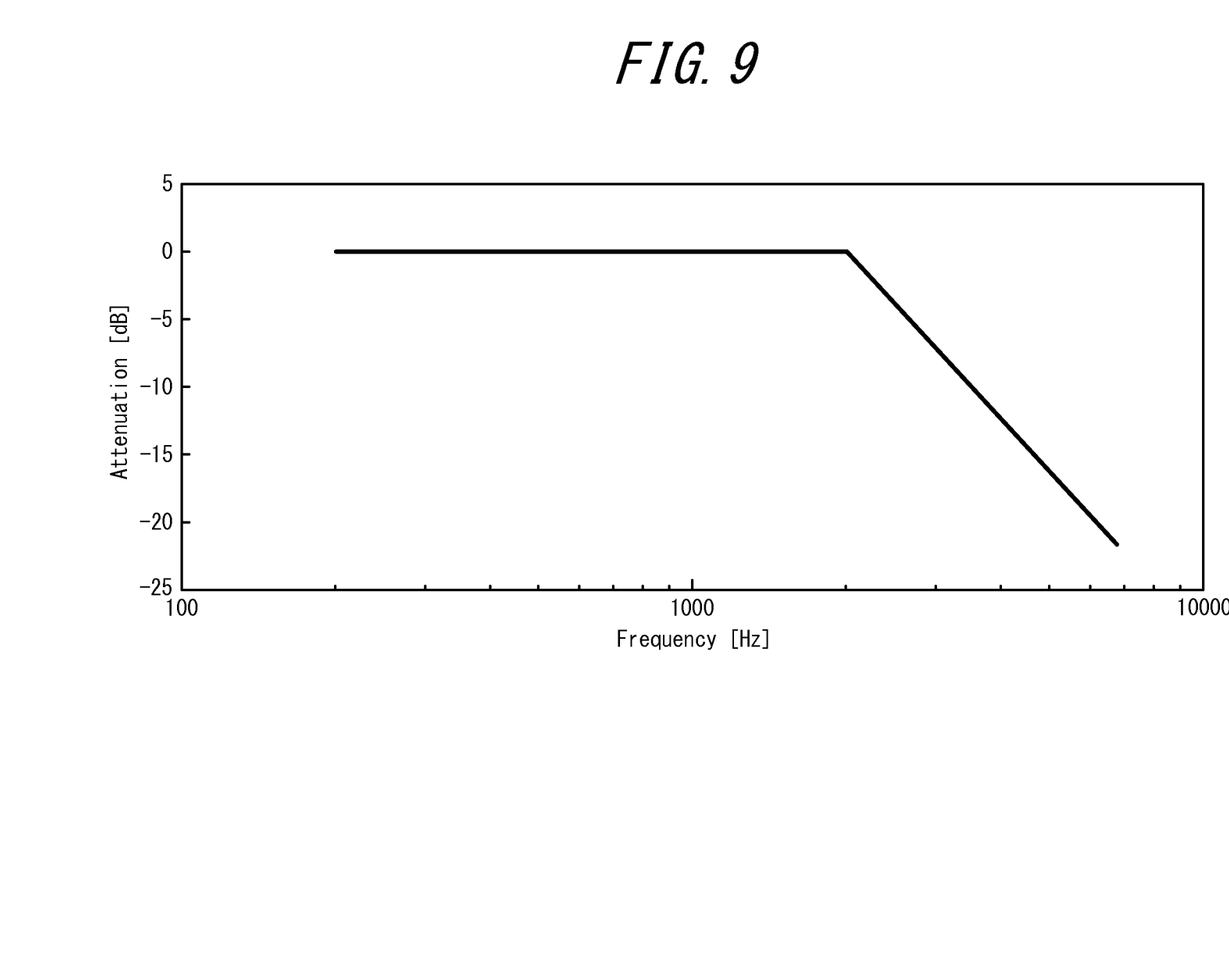
FIG. 9 illustrates one example of a filter characteristic used for sound leakage reduction.

The electronic device 1 may also include a filter by which the cutting and the attenuation of the at least the part of the frequency components higher than the predetermined threshold value is conducted. FIG. 9 illustrates one example of a filter characteristic used for sound leakage reduction. The filter characteristic illustrated in FIG. 9 corresponds to the sound leakage characteristic of the piezoelectric receiver illustrated in FIG. 8. The filter is set such that attenuation of the sound reproduction signal is increased at higher frequencies in the frequency range of 2 kHz or higher. Furthermore, the filter is configured not to cut or attenuate the sound reproduction signal in the frequency range of less than 2 kHz. By using such a filter, sound leakage is reduced while a preferable voice reception characteristic is obtained.

First Embodiment

Figure 3A:
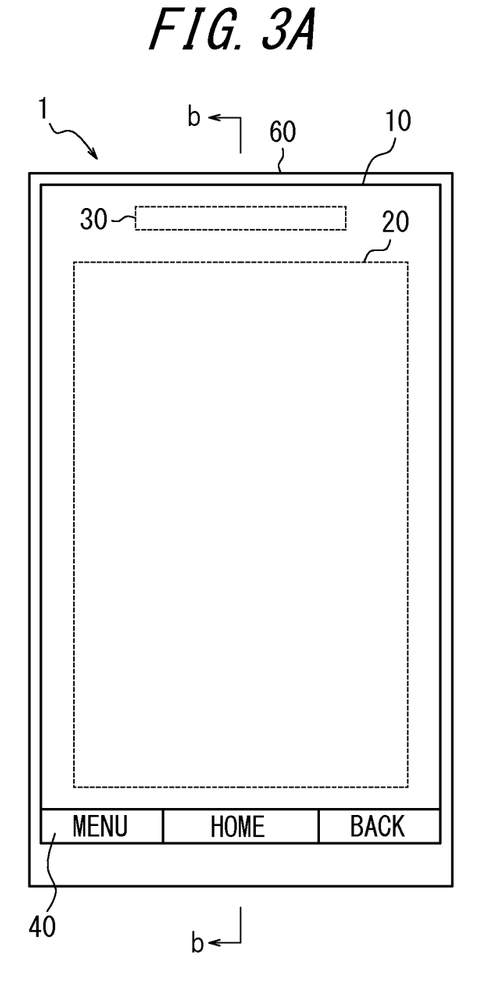
FIGS. 3A and 3B illustrate a housing structure of an electronic device according to a first embodiment.
Figure 3B:
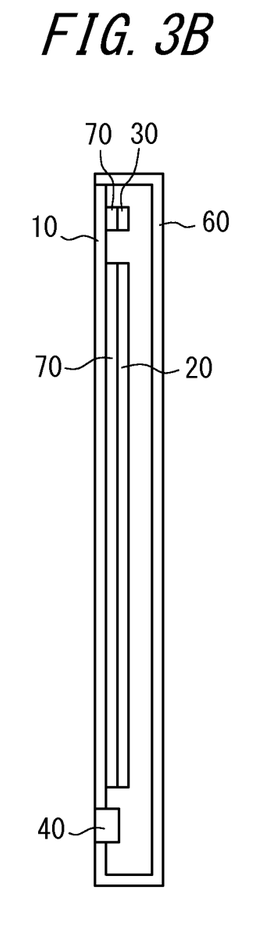

FIGS. 3A and 3B illustrate a housing structure of the electronic device 1 according to a first embodiment. FIG. 3A is a front view, and FIG. 3B is a sectional view taken along a line b-b of FIG. 3A. The electronic device 1 illustrated in FIGS. 3A and 3B is a smartphone in which the touch panel, i.e., a glass plate, is disposed on a front surface of a housing 60 (e.g. a metal or a resin casing). The panel 10 and the input unit 40 are supported by the housing 60, and the display unit 20 and the piezoelectric element 30 are each adhered to the panel 10 by a joining member 70. Note that the joining member 70 may be the adhesive agent, the double-sided adhesive tape, or the like having thermosetting properties, ultraviolet-curable properties, and the like. For example, the joining member 70 may be an optical elastic resin, which is a colorless and transparent ultraviolet-curable acrylic adhesive agent. The panel 10, the display unit 20, and the piezoelectric element 30 each have a substantially rectangular shape.

The display unit 20 is disposed in substantially a middle of the panel 10 in a short-side direction thereof. The piezoelectric element 30 is disposed near an end of the panel 10 in the longitudinal direction of the panel 10 at a predetermined distance from the end such that the longitudinal direction of the piezoelectric element 30 extends along a short side of the panel 10. The display unit 20 and the piezoelectric element 30 are disposed side by side in a direction parallel to a surface of an inner side of the panel 10.

Figure 4:
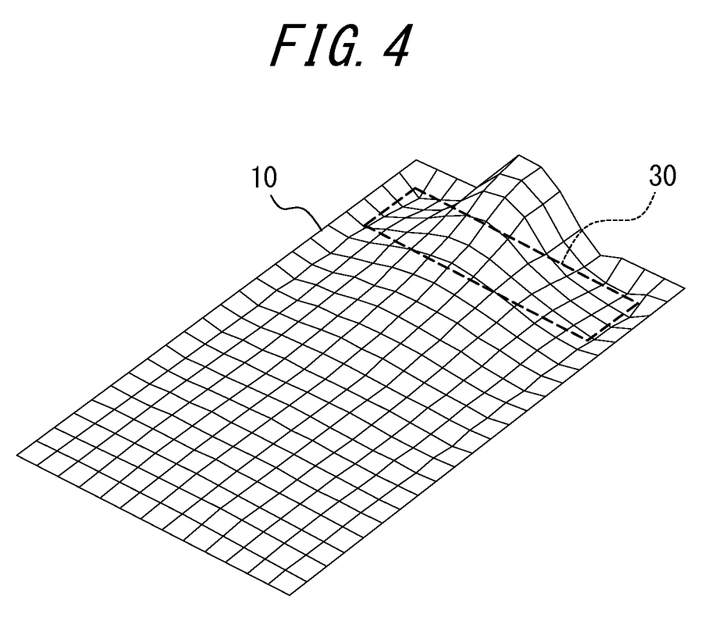
FIG. 4 illustrates one example of a vibration of a panel of the electronic device according to the first embodiment.

FIG. 4 illustrates one example of the vibration of the panel 10 of the electronic device 1 according to the first embodiment. In the electronic device 1 according to the first embodiment, the display unit 20 is attached to the panel 10. Accordingly, the lower portion of the panel 10 is less likely to vibrate compared to the upper portion of the panel 10 attached with the piezoelectric element 30. As a result, in the lower portion of the panel 10, sound leakage due to the vibration occurring in the lower portion of the panel 10 is reduced. The panel 10 in the upper portion thereof is bent directly by the piezoelectric element 30, and the vibration in the lower portion is attenuated compared to the vibration in the upper portion. The panel 10 is bent by the piezoelectric element 30 such that a portion of the panel 10 directly above the piezoelectric element 30 protrudes relative to neighboring portions of the panel 10 in a long side direction of the piezoelectric element 30.

As described above, according to the electronic device 1 of the present embodiment, the panel 10 is deformed due to deformation of the piezoelectric element 30 attached to the back surface of the panel 10, and air-conduction sound and human body vibration sound are transmitted to an object that is in contact with the deformed panel 10. As a result, air conduction sound and human body vibration sound are transmitted to the user without having to protrude the vibration body from an outer surface of the housing 60. Accordingly, usability of the electronic device is improved compared to such an electronic device as described in Patent Literature 1 (Japanese Patent Application Publication No. 2005-348193), by which the user places the vibration body, which is significantly small compared to the housing, in contact with the body. Furthermore, since there is no need for pressing the user's ear to the piezoelectric element itself, the piezoelectric element 30 itself is less likely to be damaged. Moreover, in the case where the panel 10 is vibrated, the user is less likely to drop a terminal device compared with a case where not the panel 10 but the housing 60 is deformed for generating the vibration.

The piezoelectric element 30 is joined to the panel 10 by the joining member 70. The above structure allows attachment of the piezoelectric element 30 to the panel 10 while flexibility of deformation of the piezoelectric element 30 is not significantly limited. The joining member 70 may be the adhesive agent that is not thermosetting. The above structure provides an advantage that contraction due to a thermal stress is less likely to occur during curing between the piezoelectric element 30 and the panel 10. The joining member 70 may be the double-sided adhesive tape. The above structure provides an advantage that a contraction stress, which often occurs when the adhesive agent is used, is less likely to be applied between the piezoelectric element 30 and the panel 10.

Second Embodiment

Figure 5A:
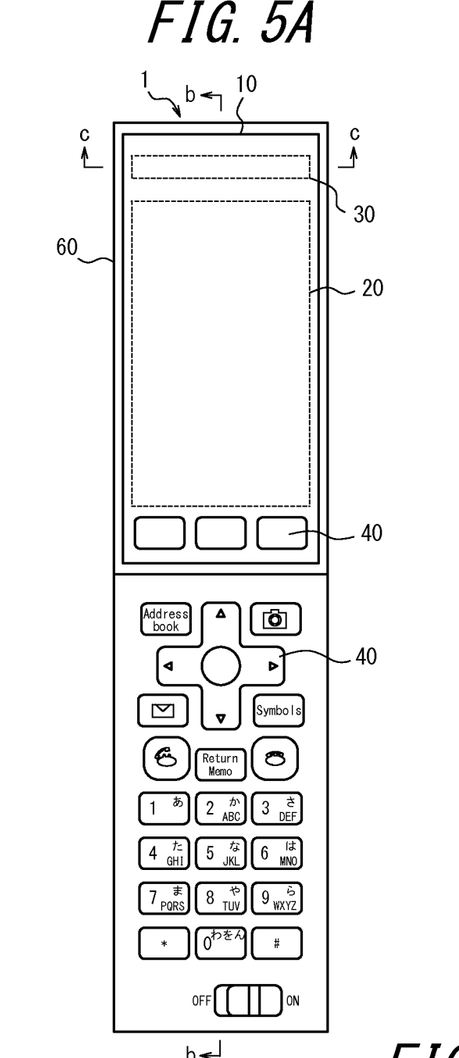
FIGS. 5A-5C illustrate a housing structure of an electronic device according to a second embodiment.
Figure 5B:
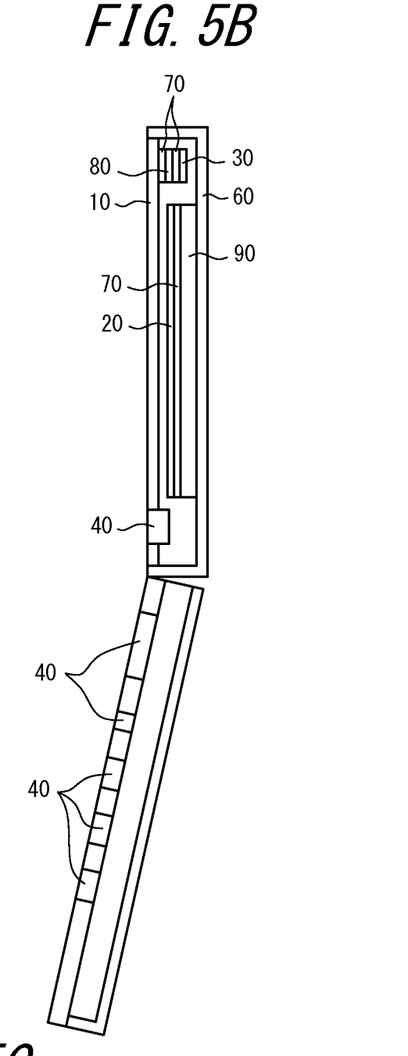
Figure 5C:
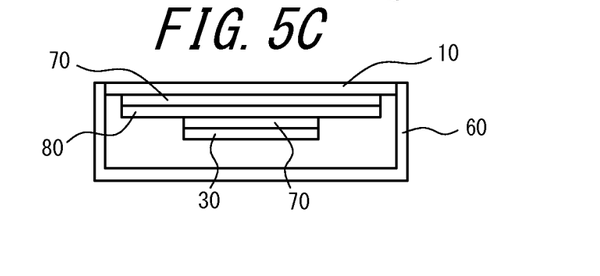

FIGS. 5A-5C illustrate the housing structure of the electronic device 1 according to a second embodiment. FIG. 5A is a front view, FIG. 5B is a sectional view taken along a line b-b of FIG. 5A, and FIG. 5C is a sectional view taken along a line c-c of FIG. 5A. The electronic device 1 illustrated in FIGS. 5A-5C is a foldable mobile phone in which a cover panel (e.g. an acryl plate), which serves as the panel 10 and configured to cover the display unit 20, is provided on a front surface of an upper-side housing 60. In the second embodiment, the reinforcing member 80 is disposed between the panel 10 and the piezoelectric element 30. The reinforcing member 80 may be a resin plate, a metal plate, or a resin plate including glass fiber. That is to say, the electronic device 1 according to the second embodiment has a structure where the piezoelectric element 30 and the reinforcing member 80 are adhered by the joining member 70, and the reinforcing member 80 and the panel 10 are adhered by the joining member 70. Furthermore, in the second embodiment, the display unit 20 is not adhered to the panel 10 but supported by the housing 60. That is to say, the electronic device 1 according to the second embodiment has a structure where the display unit 20 is spaced apart from the panel 10, and the display unit 20 is adhered to the support portion 90, i.e., a part of the housing 60, by the joining member 70. The support unit 90 is not limited to be configured as the part of the housing 60 and may be configured by metal, resin, or the like, as a member independent from the housing 60.

Figure 6:
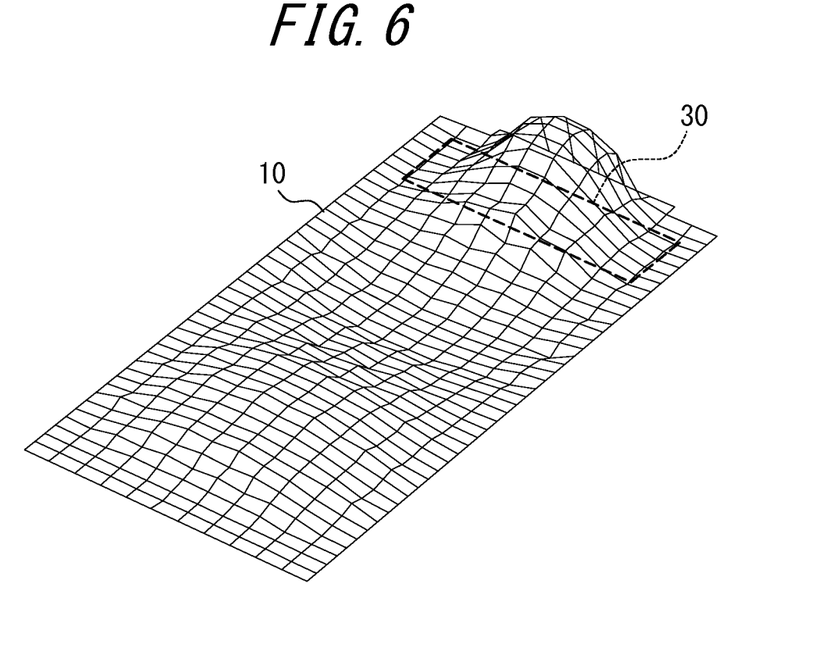
FIG. 6 illustrates one example of a vibration of a panel of the electronic device according to the second embodiment.

FIG. 6 illustrates one example of the vibration of the panel 10 of the electronic device 1 according to the second embodiment. Since in the electronic device 1 according to the second embodiment the panel 10 is the acryl plate with lower rigidity compared to the glass plate, and moreover, the display unit 20 is not adhered to the back surface of the panel 10, amplitude generated by the piezoelectric element 30 is larger than the case of the electronic device 1 according to the first embodiment as illustrated in FIG. 4. The vibration is caused in an area of the panel 10 where the piezoelectric element 30 is disposed and in areas of the panel 10 that are away from the disposed area. Accordingly, the user is able to hear air-conduction sound transmitted through air and to hear human body vibration sound by placing the ear in contact with any position of the panel 10.

As described above, according to the electronic device 1 of the present embodiment, the reinforcing member 80 and the panel 10 are deformed due to deformation of the piezoelectric element 30 attached to the panel 10 via the reinforcing member 80, and air-conduction sound and human body vibration sound are transmitted to an object that is in contact with the deformed panel 10. Accordingly, air-conduction sound and human body vibration sound are transmitted to the user without the need for pressing the vibration body itself to the ear. Furthermore, the piezoelectric element 30 is attached to the surface of the inner side of the housing 60 of the panel 10. As a result, air conduction sound and human body vibration sound are transmitted to the user without having to protrude the vibration body from the outer surface of the housing 60. Moreover, the deformation is caused in the area of the panel 10 where the piezoelectric element 30 is disposed and in other areas of the panel 10, for transmission of air-conduction sound and human body vibration sound. Accordingly, the user is able to hear air-conduction sound transmitted through air and to hear human body vibration sound by placing the ear in contact with any position of the panel 10.

Furthermore, by disposing the reinforcing member 80 between the piezoelectric element 30 and the panel 10, when the panel 10 is applied with an external force, the applied external force is less likely to be transferred to the piezoelectric element 30 and damage the piezoelectric element 30. Even when the panel 10 is forcefully pressed against the human body, the attenuation in the vibration of the panel 10 is reduced. Moreover, owing to the reinforcing member 80 disposed between the piezoelectric element 30 and the panel 10, a resonance frequency of the panel 10 is lowered, and a sound characteristic in a low frequency range is improved. Note that instead of the reinforcing member 80 a plate-shaped weight may be attached to the piezoelectric element 30 by the joining member 70.

Although the present invention has been described based on the drawings and the embodiments thereof, it should be noted that a person skilled in the art may easily make a variety of modifications and alterations according to the present disclosure. Note that the modifications and alterations are within the scope of the present invention. For example, functions and the like included in the components and steps may be rearranged as long as the functions and the like are logically consistent. A plurality of component parts, the steps, and the like may also be integrated or separated.

Figure 7:
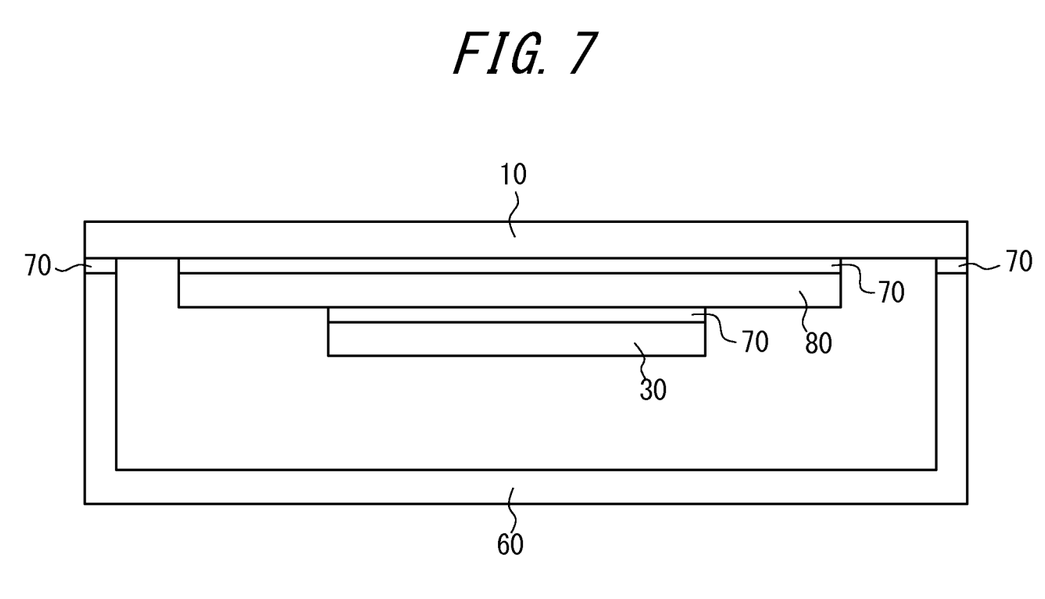
FIG. 7 illustrates one example of joining between a panel and a housing.

For example, as illustrated in FIG. 7, the panel 10 may be configured to be joined to the housing 60 by the joining member 70. By thus preventing the vibration of the panel 10 from being transmitted directly to the housing 60, the risk that the user drops the electronic device 1 is reduced compared to the case where the housing itself undergoes a large vibration. The joining member 70 may be the adhesive agent that is not thermosetting. The above structure provides an advantage that contraction due to a thermal stress is less likely to occur during curing between the housing 60 and the panel 10. The joining member 70 may be the double-sided adhesive tape. The above structure provides an advantage that a contraction stress, which often occurs when the adhesive agent is used, is less likely to be generated between the housing 60 and the panel 10.

When the panel 10 and the display unit 20 are not superposed, for example, the piezoelectric element 30 may be disposed in the middle of the panel 10. When the piezoelectric element 30 is disposed in the middle of the panel 10, the vibration of the piezoelectric element 30 is evenly transmitted to the whole panel 10, thereby improving a quality of air-conduction sound and allowing the user to perceive human body vibration sound even when the user places the ear in contact with the panel 10 at different positions of the panel 10. Note that, similarly to the first embodiment, the piezoelectric element 30 may be provided in plurality.

Although in the above electronic device 1 the piezoelectric element 30 is adhered to the panel 10, the piezoelectric element 30 may be attached to another place than the panel 10. For example, the piezoelectric element 30 may be adhered to a battery lid that is configured to be attached to the housing 60 to cover a battery. Since the battery lid is often attached to a surface different from the panel 10 in the electronic device 1 such as the mobile phone, the above structure enables the user to listen to sound by placing a portion of the body (e.g. the ear) in contact with the surface different from the panel 10.

The panel 10 may form a part or an entirety of any one of a display panel, an operation panel, the cover panel, and a lid panel that allows a rechargeable battery to be detachable. Preferably, when the panel 10 is the display panel, the piezoelectric element 30 is disposed outside of a display area provided for a display function. The above structure provides an advantage that display is less likely to be disturbed. The operation panel includes the touch panel of the first embodiment. The operation panel may also include a sheet key, namely, a component of the foldable mobile phone or the like that is integrally provided with a key top as the operation key and that forms one surface of the housing on an operational side.

Meanwhile, in the first embodiment and the second embodiment, the joining member used for adhering the panel 10 and the piezoelectric element 30, the joining member used for adhering the panel 10 and the housing 60, and the like are denoted by the same reference numeral as the joining member 70. However, the joining members used in the first embodiment and the second embodiment may be different depending on the components to be joined, as appropriate.

REFERENCE SIGNS 1 electronic device
10 panel (vibration plate)
20 display unit
30 piezoelectric element
40 input unit
50 control unit
60 housing
70 joining member
80 reinforcing member
90 support portion

The invention claimed is:

1. An electronic device configured for positioning in contact against a portion of a human body comprising:
   a housing including an interior and an exterior;
   a piezoelectric element positioned in the interior of the housing; and
   a vibration plate including a back surface facing the interior of the housing and a front surface positioned to face the portion of the human body, the vibration plate configured to be vibrated by the piezoelectric element and to be joined to the housing such that vibration of the vibration plate by the piezoelectric element is higher in an upper portion thereof including a joining portion with the piezoelectric element than in a lower portion thereof,
   wherein sound is transmitted by bending the vibration plate with the piezoelectric element such that a portion of the vibration plate directly above the piezoelectric element protrudes to a greater extent than all neighboring portions of the vibration plate adjacent to a long side of the piezoelectric element and by vibrating a contacting part of a human body that is in contact with the bent vibration plate, the protruding portion of the vibration plate located directly above the piezoelectric element and including a portion of the front surface positioned in nonoverlapping relationship with the housing in a direction normal to the front surface extending towards the exterior to expose the nonoverlapping portion of the front surface to the exterior, wherein the piezoelectric element is vibrated using a signal in which at least a part of frequency components that are higher than a predetermined threshold value is cut or attenuated, and wherein the piezoelectric element is directly attached to the back surface of the vibration plate via a joining member.

2. The electronic device of claim 1, wherein an attenuation rate of the signal is increased gradually or stepwise at higher frequencies.

3. The electronic device of claim 1, wherein the cutting or the attenuation of the at least the part of the frequency components higher than the predetermined threshold value is performed by a filter.

4. The electronic device of claim 1, wherein the predetermined threshold value is set to be any one of the frequencies of from 0.4 kHz to 3.4 kHz.

5. The electronic device of claim 1, wherein frequency components lower than or equal to the predetermined threshold value are not cut or attenuated.

6. The electronic device of claim 1, wherein the vibration plate is larger than an ear.

7. The electronic device of claim 1, wherein the vibration plate comprises a panel for display.

8. The electronic device of claim 7, wherein the piezoelectric element is disposed outside of a display area provided for a display function.

9. An electronic device configured for positioning in contact against a portion of a human body, comprising:
a piezoelectric element;
a vibration plate to which the piezoelectric element is joined for vibration; and
a housing to which the vibration plate is joined such that vibration of the vibration plate by the piezoelectric element is higher in an upper portion thereof including a joining portion with the piezoelectric element than in a lower portion thereof, the housing including an interior and an exterior and the piezoelectric element positioned in the interior of the housing, the vibration plate including a back surface facing the interior of the housing and a front surface positioned to face the portion of the human body, the front surface including an area positioned directly opposite and corresponding to an extent of the piezoelectric element, at least a portion of the area of the front surface being free from overlap with the housing in a direction normal to the front surface extending towards the exterior to expose the portion of the area free from overlap to the exterior, wherein sound is transmitted by bending the vibration plate with the piezoelectric element such that a portion of the vibration plate directly above the piezoelectric element protrudes to a greater extent than all neighboring portions of the vibration plate adjacent to a long side of the piezoelectric element and by vibrating a pressed part of a human body that is pressed against the bent vibration plate, and wherein the piezoelectric element is directly attached to the back surface of the vibration plate via a joining member.

10. The electronic device of claim 9, wherein, with the vibration plate pressed with force greater than or equal to 3 N, and the pressed part of the vibration plate is vibrated, sound is transmitted by the vibration plate.

11. The electronic device of claim 9, wherein, with the vibration plate pressed with force greater than or equal to 5 N, and the pressed part is vibrated, sound is transmitted by the vibration plate.

12. The electronic device of claim 9, wherein, with the vibration plate pressed with force less than or equal to 10 N, and the pressed part is vibrated, sound is transmitted by the vibration plate.

* * * * *